(12) United States Patent
Väth

(10) Patent No.: US 7,976,301 B2
(45) Date of Patent: Jul. 12, 2011

(54) DEVICE AND METHOD FOR REMOVING AN OBLONG BURR FROM A MOLDED PART

(75) Inventor: Norbert Väth, Esselbach (DE)

(73) Assignee: Takata-Petri AG, Aschaffenburg (DE)

( * ) Notice: Subject to any disclaimer, the term of this patent is extended or adjusted under 35 U.S.C. 154(b) by 744 days.

(21) Appl. No.: 12/010,104

(22) Filed: Jan. 18, 2008

(65) Prior Publication Data

US 2008/0179794 A1     Jul. 31, 2008

Related U.S. Application Data

(63) Continuation of application No. PCT/DE2006/001188, filed on Jul. 6, 2006.

(30) Foreign Application Priority Data

Jul. 19, 2005 (DE) .......................... 10 2005 034 627

(51) Int. Cl.
B23K 26/36 (2006.01)
B29C 59/16 (2006.01)

(52) U.S. Cl. .................... 425/174.4; 216/65; 219/121.68

(58) Field of Classification Search ............... 425/174.4; 219/85.12, 121.67, 121.68, 121.7; 216/65, 216/66

See application file for complete search history.

(56) References Cited

U.S. PATENT DOCUMENTS

| 4,318,163 | A | * | 3/1982 | Bryan | 362/359 |
| 4,469,529 | A | * | 9/1984 | Mimura | 438/530 |
| 4,518,551 | A | | 5/1985 | Lin | |
| 4,535,223 | A | | 8/1985 | Westerman, Jr. | |
| 5,278,938 | A | * | 1/1994 | Spigarelli et al. | 392/420 |
| 5,449,882 | A | * | 9/1995 | Black et al. | 219/121.83 |
| 5,628,859 | A | * | 5/1997 | Janin et al. | 156/273.3 |
| 5,677,983 | A | * | 10/1997 | Oparin et al. | 392/421 |
| 5,783,831 | A | * | 7/1998 | Tusch | 250/495.1 |
| 5,851,335 | A | * | 12/1998 | Budnik et al. | 156/257 |

(Continued)

FOREIGN PATENT DOCUMENTS

| DE | 98 235 C | 6/1973 |
| DE | 32 45 833 A1 | 6/1984 |

(Continued)

OTHER PUBLICATIONS

Bopp, Dr. Marie-Luise, Infrarotstrahler für Automobilzulieferer, Angepasst an Produkt und Fertigung, Plastikverarbeiter, No. 12, 2004.

*Primary Examiner* — Yogendra N Gupta
*Assistant Examiner* — Emmanuel S Luk
(74) *Attorney, Agent, or Firm* — Foley & Lardner LLP

(57) ABSTRACT

A device for removing an oblong burr from a molded part including an energy source that introduces energy into the burr for removing the burr by heating. The energy source includes an infrared transmitter that irradiates the oblong burr with infrared radiation, a sleeve for receiving the infrared transmitter with an inner face facing the infrared transmitter and an outer face remote from the infrared transmitter, and an outlet region through which energy may be transported in the direction of the burr. The sleeve has an outer coating with a surface facing the outside, and an inner face facing the infrared transmitter which at least partially encloses the sleeve. Infrared radiation emitted by the energy source is concentrated by a radiation-forming element, so that only the burr is irradiated by the infrared radiation. The radiation-forming element may be formed by a gap in the outer coating.

18 Claims, 4 Drawing Sheets

U.S. PATENT DOCUMENTS

| | | | |
|---|---|---|---|
| 5,901,270 A | | 5/1999 | Quin |
| 6,711,203 B1 * | | 3/2004 | Garnache et al. ............... 372/92 |
| 6,713,945 B2 * | | 3/2004 | Fuchs et al. ................... 313/113 |
| 6,874,510 B2 * | | 4/2005 | Reder et al. .................... 134/1.3 |
| 7,212,735 B2 * | | 5/2007 | Konishi ........................ 392/407 |
| 2007/0048553 A1 * | | 3/2007 | Nakano et al. ............. 428/846.2 |

FOREIGN PATENT DOCUMENTS

| | | |
|---|---|---|
| DE | 42 36 558 A1 | 5/1993 |
| DE | 92 18 016 U1 | 9/1993 |
| DE | 42 42 812 | 6/1994 |
| DE | 198 04 265 A1 | 9/1998 |
| DE | 298 23 539 U1 | 9/1999 |
| DE | 101 53 474 A1 | 5/2003 |
| EP | 1 050 394 A1 | 11/2000 |
| EP | 1 308 258 | 5/2003 |
| GB | 832 738 | 4/1960 |
| GB | 2 260 933 | 5/1993 |

* cited by examiner

DEVICE AND METHOD FOR REMOVING AN OBLONG BURR FROM A MOLDED PART

CROSS REFERENCE TO RELATED APPLICATIONS

This application is a Continuation of US Application PCT/DE2006/001188, filed Jul. 6, 2006, which is incorporated herein by reference in its entirety. This International Application was not published in English but was published in German as WO 2007/009429.

BACKGROUND

The invention relates to a device for removing an oblong burr from a molded part.

Such a device comprises as essential elements an energy source which introduces energy into the burr for removing the burr by melting or burning the burr, the energy source comprising an outlet region through which energy may be transported toward the burr.

Burrs occur during manufacturing processes of molded parts, for example when casting plastics in a mold comprising a mold joint. Such a mold is fitted together along the mold joint for producing the molded part and, as a result, forms a negative shape into which a fluid material is introduced which cures or solidifies in the mold.

In this connection, the fluid material is located in the inside of the mold in joints of the mold formed by the mold joint and thus, during curing or solidifying, forms an oblong burr extending along the mold joint. Moreover, structuring a surface of a wall of the negative shape facing the molded part which, for example, serves to form embossed surfaces on the molded part, may promote such burr formation.

Frequently, such burrs are located on visible regions or grip regions of a molded part and are regarded by a consumer as troublesome. Moreover, paint collecting regions are formed by each burr during a painting process, so that a uniform application of color and/or paint is not able to be carried out. Removal of the burr formed on a molded part is, therefore, desirable.

In known devices and methods this takes place using mechanical deburring tools in the form of cutters or milling tools, that mechanically removed the burr, for example by cutting off or grinding off the burr, as well as by using deburring tools for generating hot air or open flames, which are used for removing the burr by melting the burr. For removing a burr, the aforementioned deburring tools may be guided manually or automatically (using robots) along the burr. In this connection, however, there is the drawback that, on the one hand, manual guiding, i.e. by hand, of such a deburring tool leads to difficulties in the ability to reproduce a deburring process and, on the other hand, automatic guiding of the deburring tool is correspondingly complicated and cost-intensive when the burr has an oblong path.

It would be advantageous to provide a device and a method for removing an oblong burr from a molded part, which allow cost-effective and accurate removal of the burr.

SUMMARY

One exemplary embodiment relates to a device for removing an oblong burr from a molded part including an energy source that introduces energy into the burr for removing the burr by heating. The energy source includes an infrared transmitter that irradiates the oblong burr with infrared radiation, a sleeve for receiving the infrared transmitter with an inner face facing the infrared transmitter and an outer face remote from the infrared transmitter, and an outlet region through which energy may be transported in the direction of the burr wherein the sleeve has an outer coating with a surface facing the outside, and an inner face facing the infrared transmitter which at least partially encloses the sleeve. Infrared radiation emitted by the energy source is concentrated by a radiation-forming element, so that only the burr is irradiated by the infrared radiation. The outlet region is formed by a gap in the outer coating that is of oblong configuration so that it may be arranged along the oblong burr following a path of the burr. The radiation-forming element is formed by the gap in the outer coating.

Another embodiment relates to a method for removing an oblong burr from a molded. The method includes providing a molded part with an oblong burr, positioning the molded part relative to an energy source in a machining position. Energy is transported to the burr through an outlet region of the energy source facing the burr and extending in a direction of extension longitudinally along the burr. The energy source includes an infrared transmitter that irradiates the oblong burr with infrared radiation and a sleeve for receiving the infrared transmitter with an inner face facing the infrared transmitter and an outer face remote from the infrared transmitter. The sleeve has an outer coating with a surface facing the outside and an inner face facing the infrared transmitter that at least partially encloses the sleeve. The outlet region of the energy source is formed by a gap in the outer coating of the sleeve. The method further includes removing the burr by introducing the energy into the burr along the gap, infrared radiation emitted by the energy source being able to be concentrated by a radiation-forming element, so that only the burr is irradiated by the infrared radiation, and the radiation-forming element being formed by the gap in the outer coating.

DETAILED DESCRIPTION

Figure 1:
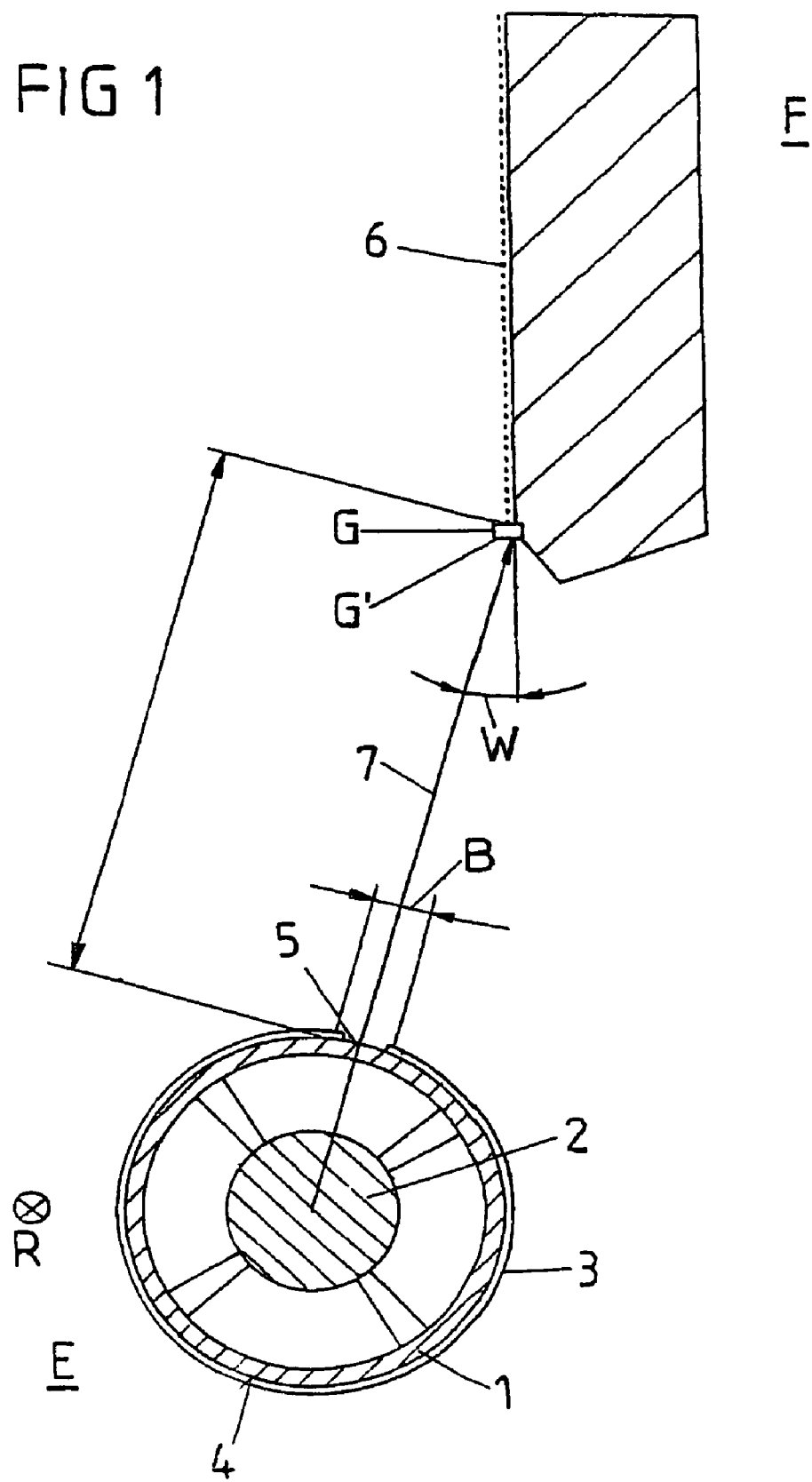
FIG. 1 is a schematic sectional view of a device for removing an oblong burr from a molded part as well as a molded part and an oblong burr formed thereon.

Embodiments of the invention are therefore based on a device and method to remove an oblong burr. Accordingly, with a device according to the invention the outlet region of the energy source is of oblong configuration so that it may be arranged along the oblong burr, following a path of the burr. This solves the problem according to the invention as it is thus ensured that the energy may be introduced into the burr for melting or burning the burr due to an arrangement of the outlet region flanking the oblong burr, so that complicated guiding of a deburring tool along the burr may be dispensed with. Moreover, the removal of the burr may be reproduced, as during a deburring process, i.e. during removal of the oblong burr, the oblong burr adopts a defined position relative to the outlet region. According to the design of the energy source, the device according to the invention may be used for removing burrs from molded parts made of different materials, such as for example plastics or even light metals such as aluminum or magnesium.

In an embodiment of the invention, the outlet region is curved, so that it may be arranged along an oblong burr, following a curved path of the burr. In other words, the outlet region follows a path of the oblong burr. Preferably, the outlet region encloses, in this case, an angle of at least 180°. This means that the outlet region is configured so that a curved oblong burr may be encompassed by the outlet region in a direction of extension of the burr by at least 180°.

The term oblong element is an element which extends along a curved path, the extension of the body into the two separate spatial directions which are oriented at any point of the curved path respectively perpendicular to the curved path, being smaller than along the path. The direction of extension of such an element runs at any point of the curved path along which the element extends, respectively tangentially to the curved path. The term oblong has a similar meaning to the above when referring to the shape of a burr, outlet region, etc.

In another embodiment, it is provided that the outlet region extends along an enclosed curved path. This is advantageous, as oblong burrs formed on molded parts are generally configured to be enclosed. By a corresponding configuration of the outlet region, said outlet region may be arranged relative to the oblong burr so that it extends along the entire burr in the direction of extension of the burr.

According to one embodiment, the outlet region encloses an angle of 360°. In this connection, the outlet region may extend along an enclosed curved path. It is, however, also possible that the oblong outlet region only overlaps with two free end portions so that the outlet region encloses an angle of 360°. In this case, the two free end portions would be spaced apart from one another. This is advantageous as, for example, with an energy source which comprises a glass sleeve, along the surface of which the outlet region extends, the path of the outlet region curved by 360° may be produced by simple deformation of a linear oblong glass sleeve.

The outlet region of the energy source may be oblong in a direction of extension, so that it may be arranged perpendicular to the direction of extension with a uniform spacing from the burr. In this case, each spacing may be in the region of five to 25 millimeters. Such a uniform spacing from the oblong burr is advantageous, as with a burr of uniform configuration in the direction of extension, the removal of the burr by introducing energy into the burr, therefore, produces a uniform, i.e. consistent surface characteristic of the molded part along the region on which the burr was formed before its removal.

The energy source may be configured to transport an energy that is concentrated on the burr. The energy source may, in this case, be configured in particular so that regions of the molded part adjacent to the burr are not heated directly by the energy source.

According to one exemplary embodiment, the energy source is configured to irradiate energy in the form of infrared radiation onto the oblong burr. The energy source comprises an infrared transmitter. Preferably, the infrared transmitter is configured as an elongate wire which, for example, may be excited by applying a voltage for emitting infrared radiation, the infrared transmitter preferably extending longitudinally along the outlet region of the energy source.

The energy source may have a sleeve for receiving the infrared transmitter with an inner face facing the infrared transmitter and an outer face remote from the infrared transmitter. Preferably said sleeve is made from a glass and preferably has an outer coating with a surface facing the outside, and an inner face facing the infrared transmitter which at least partially encloses the sleeve. Preferably, in this case the outlet region is formed by a gap in the outer coating. In this case, the outer coating may be firstly applied onto the sleeve so that the sleeve is completely enclosed by the outer coating. Subsequently, the outer coating may be partially removed, so that an oblong gap is produced in a direction of extension, which forms the outlet region of the energy source.

The infrared radiation emitted by the energy source may be concentrated by a radiation-forming element, so that only the burr is irradiated by the infrared radiation. The radiation-forming element is an element which influences the propagation of the radiation (filters, lenses, etc). In this manner, the energy transported by the radiation may be introduced accurately into the burr, so that by a melting process of the oblong burr caused by the irradiation, regions of the molded part adjacent to the burr are not detrimentally affected (i.e. deformed by heating) by transporting energy to those regions (and as a result heating of said regions). Preferably, therefore, infrared radiation emitted by the energy source may be restricted by the radiation-forming element to a removal region of the molded part containing the burr, so that the oblong burr may be melted with the removal region by introducing energy in a defined manner. The burr may naturally also be burnt by the introduction of energy and thereby removed.

Preferably, the radiation-forming element is formed by the gap in the outer coating of the sleeve. In other words, according to the width of the gap, which is the spacing of the edges of the outer coating adjacent to the gap, perpendicular to the direction of extension of the gap, a more or less large removal region of the molded part containing the burr may be irradiated by the infrared radiation. In a variant, the inner face of the outer coating is configured as a reflector for reflecting infrared radiation emitted by the infrared transmitter, which counteracts an absorption of the infrared radiation on the inner face of the outer coating of the sleeve. Preferably, the outer coating consists of gold and/or a gold alloy.

According to another exemplary embodiment, a retaining element retains the molded part with its oblong burr in a predefinable position relative to the outlet region of the energy source. An arrangement is provided comprising a device according to the invention for removing an oblong burr on a molded part, the molded part being arranged relative to the outlet region of the energy source so that the outlet region extends along the burr, following a path of the oblong burr. Preferably the burr is of oblong configuration in a direction of extension and enclosed in the direction of extension. Preferably, the burr extends in this case in a peripheral direction of the molded part along the surface of the molded part.

The molded part may be configured, as an airbag cover which, for example, may be made from a plastics material. The invention removes an oblong burr from a molded part.

In the method according to the invention, a molded part with an oblong burr is provided and positioned relative to an energy source in a machining position, so that an outlet region of the energy source facing the burr and extending in the direction of extension, through which the energy may be transported to the burr, extends longitudinally along the burr and removes the burr by introducing the energy into the burr along the outlet region.

By the introduction of energy along the burr, the burr is removed in a reproducible manner and moreover by the arrangement of the outlet region along the burr a complicated guiding of a deburring tool along the burr may be dispensed with. Moreover, it is advantageous that with the method according to the invention burrs may be removed from a plurality of materials (for example plastics, but also light metals, such as aluminum or magnesium).

The energy may be transmitted by the energy source simultaneously over the entire length of the burr. According to one exemplary embodiment, the burr is positioned relative to the energy source in the machining position, so that the outlet region perpendicular to the direction of extension has a substantially uniform spacing from the burr. Such a spacing is typically set in the region of five to 25 millimeters.

The energy is transmitted to the molded part, so that the energy is in this case concentrated on the burr. As a result, the burr may be melted with a removal region of narrow configuration perpendicular to the direction of extension of the burr and containing the burr (the removal region is thus a surface region of the molded part, from which the burr projects). Regions of the molded part adjacent to the removal region may thus be excluded from direct heating by the effect of energy.

In one embodiment, the burr is irradiated by the energy source with infrared radiation. Preferably, in this case, the removal region of the molded part containing the burr is irradiated by infrared radiation so that the burr is melted with the removal region and is thereby removed.

The infrared radiation may be focused onto the burr so that only the burr is irradiated by the infrared radiation. In this case, preferably the burr is burnt or melted with a removal region of the molded part containing the burr. In this case, the burr may, for example, be irradiated so that it becomes fluid as a result of heating induced thereby and spreads in a two-dimensional manner over the removal region.

According to one exemplary embodiment, the molded part is guided into the machining position, the molded part is retained in the machining position by a retaining element and the burr is irradiated by the infrared radiation.

The molded part may be guided with a guide means into the machining position. In this connection, the guide means may be a completely automated guide means, for example a robot. The features and advantages of the invention shown are to be explained with reference to the following description of figures of embodiments, in which:

FIG. 1 shows a schematic sectional view of a device for removing an oblong burr G from a molded part F. The device includes an energy source E extending longitudinally in a direction of extension R, comprising a sleeve 1 in the form of a cylindrical glass tube extending longitudinally in a direction of extension R which has a circular cross-sectional contour in a cross-sectional plane which extends perpendicular to the direction of extension R. The aforementioned cross-sectional plane coincides with the paper plane. The sleeve 1 forms a receiver for an infrared transmitter 2 extending longitudinally in a direction of extension R, which is arranged transversely to the direction of extension R concentrically in the sleeve 1. On an outer face of the sleeve 1, remote from the infrared transmitter 2 an outer coating 3 consisting of gold is applied. Such an outer coating 3 may, for example, be produced by vapor-plating the outer face of the sleeve 1 with gold.

The outer coating 3 applied to the sleeve 1 has an inner face 4 facing the infrared transmitter 2 which reflects infrared radiation 7 emitted by the infrared transmitter as well as a gap 5 of oblong configuration in the direction of extension R, which forms an outlet region for the infrared radiation 7 produced by the infrared transmitter 2. A gap width B of the gap 5 measured perpendicular to the direction of extension R is typically in the millimeter range. When the energy source E is manufactured, the gap 5 may be produced either by a region on which the gap 5 is to be produced being covered in a suitable manner before vapor-plating of the sleeve 1 with gold, or by partially removing an outer coating 3 completely enclosing the sleeve 1.

The energy source E is thus arranged relative to the molded part F, so that the gap 5 configured on the outer coating 3 of the sleeve 1 is located opposite a burr G of the molded part F extending longitudinally in the direction of extension R. The burr G is generally rectangular in a cross-sectional plane extending perpendicular to the direction of extension R and projects in a direction oriented perpendicular to the direction of extension R which is oriented parallel to a vertical line of a planar, embossed surface 6 of the molded part F, from an edge of the surface 6 extending in the direction of extension R, so that a face G' of the burr G extending longitudinally in the direction of extension R faces the gap 5. Moreover, the gap 5 is arranged longitudinally along the burr G so that the burr G is positioned in a direction extending perpendicular to the direction of extension R between the gap 5 and the embossed planar surface 6 of the molded part F. Infrared radiation 7 generated by the infrared transmitter 2 and emitted radially, i.e. emitted perpendicular to the direction of extension R (schematically indicated by an arrow), passes through the gap 5 in the outer coating 3 of the sleeve 1 of the energy source E and comes into contact with the face G' of the oblong burr G facing the gap 5. The gap 5 restricts a beam path of the infrared radiation 7 so that the infrared radiation 7 only covers the aforementioned face of the oblong burr G. The infrared radiation 7 emerging from the gap 5 forms a light curtain which spans the gap 5 and the oblong burr G. The gap 5, i.e. the outlet region of the energy source E, extends in the direction of extension R along the oblong burr G in the direction of extension R so that the entire face G' of the burr G facing the gap 5 may simultaneously be irradiated by infrared radiation 7. The light curtain formed by the infrared radiation 7 by the effect of the gap 5, thus extends in a plane which, together with the extension plane of the surface 6 of the molded part F, encloses an angle W which is typically in the region of 5 to 25 degrees.

Figure 2:
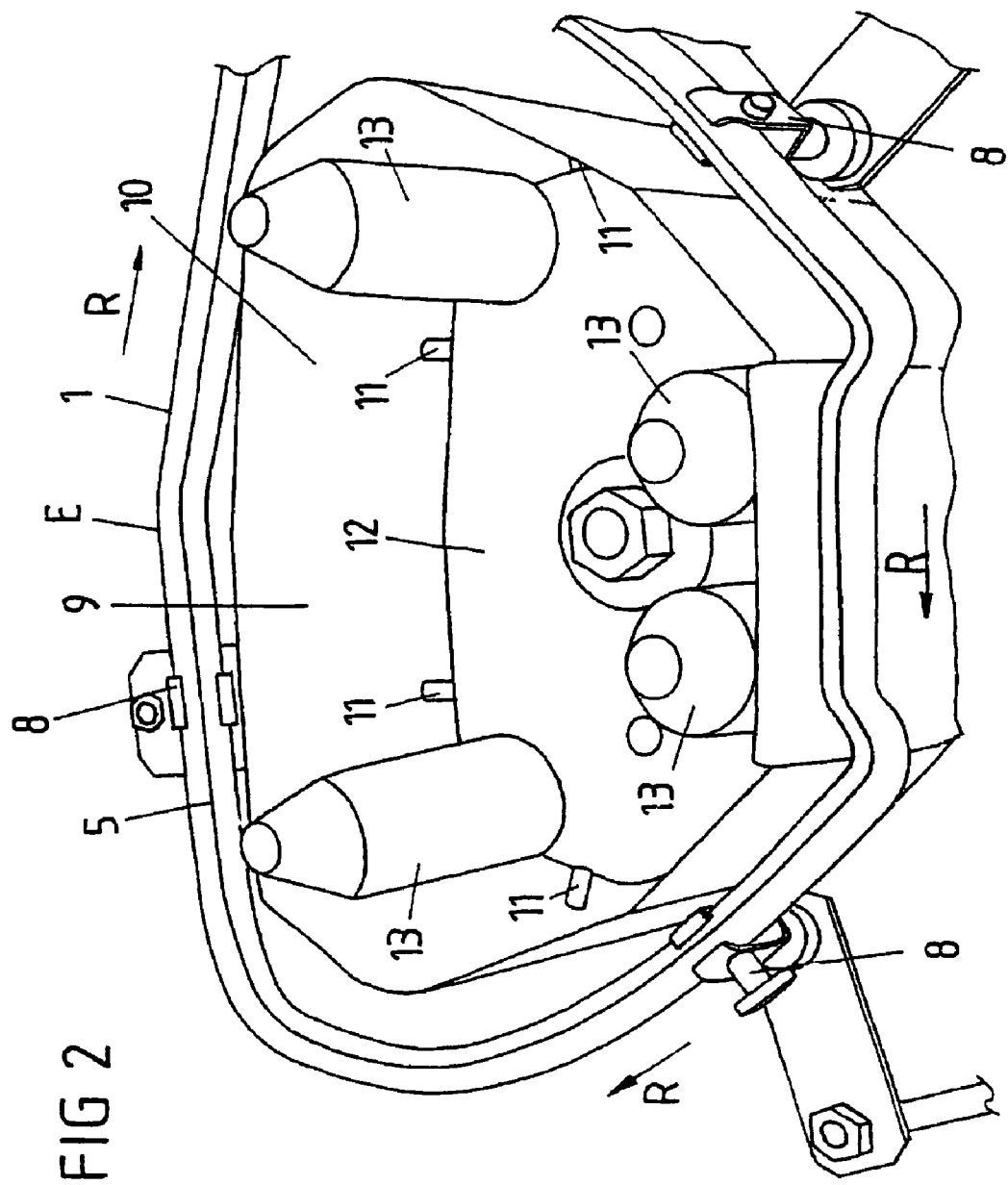
FIG. 2 is a perspective, schematic view of a device for removing an oblong burr from a molded part with an energy source and a retaining element.
Figure 3:
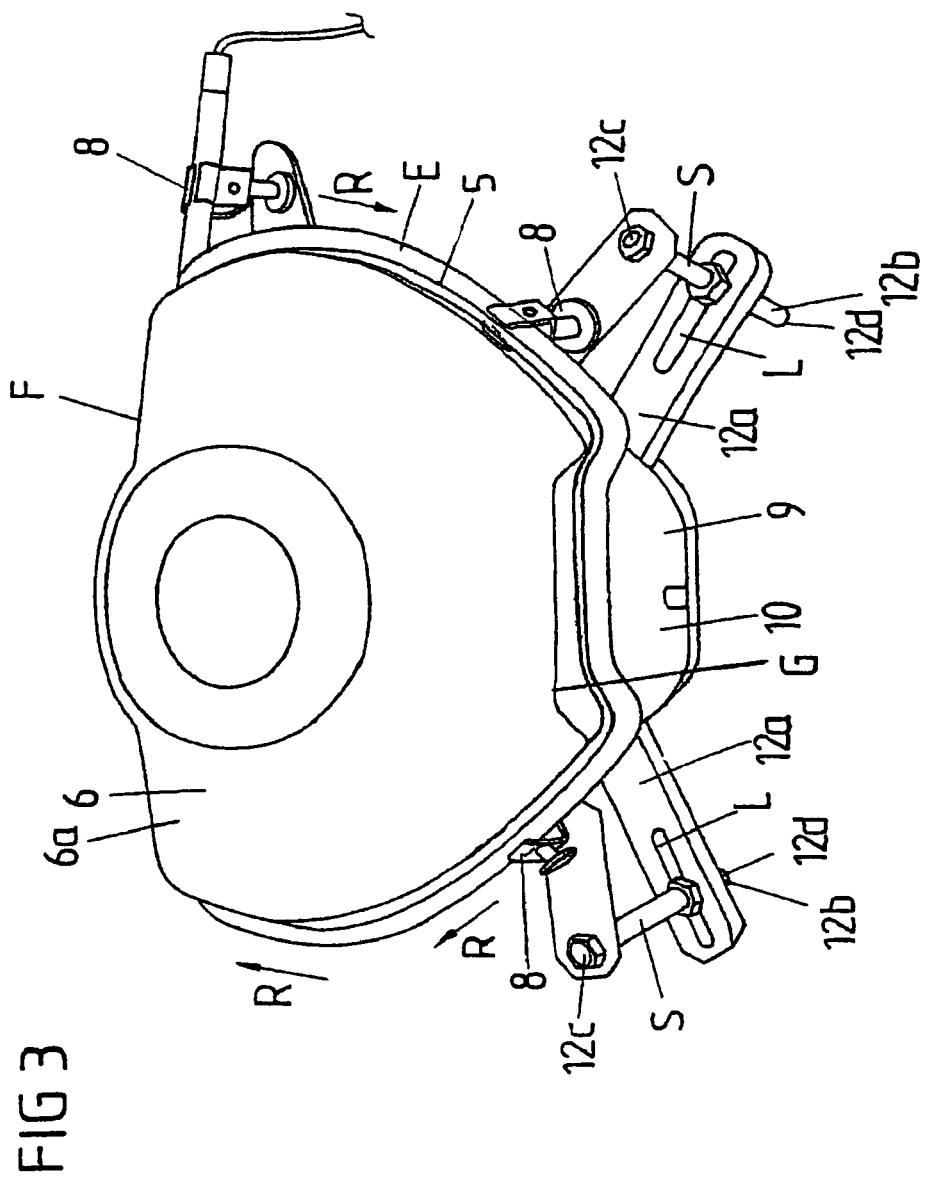
FIG. 3 is a schematic, perspective view of a device of the type described in FIG. 2, with a molded part retained by the retaining element.
Figure 4:
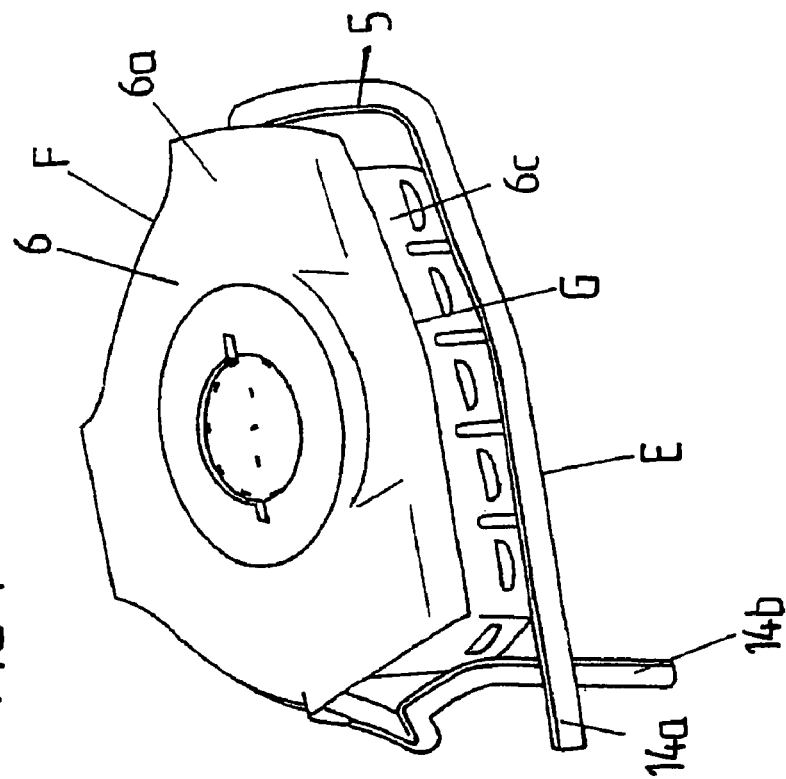
FIG. 4 is a further schematic, perspective view of a device of the type described in FIG. 2 and FIG. 3.
Figure 4A:
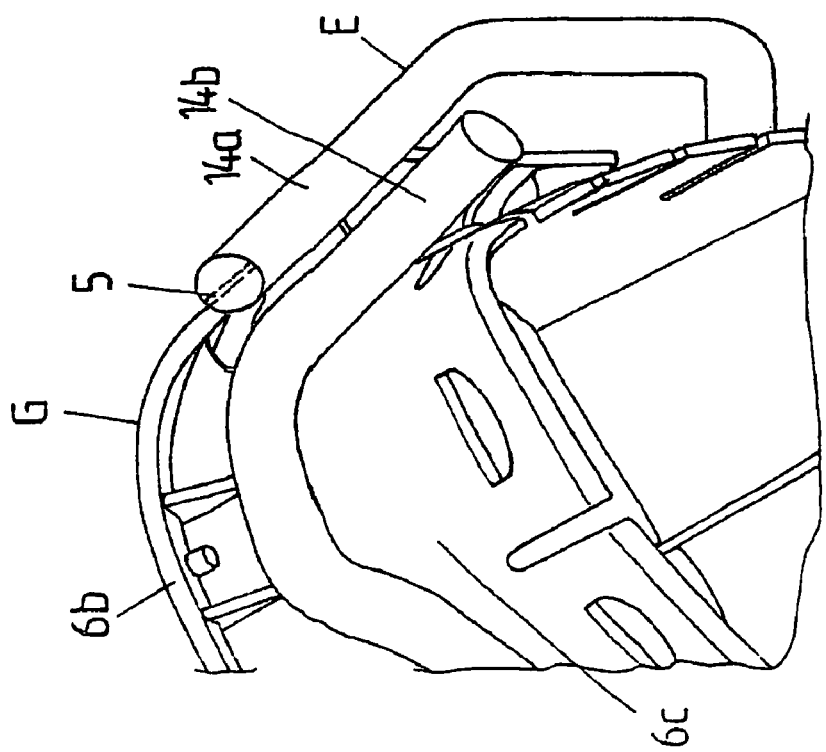
FIG. 4a is a schematic perspective view of a detail of a device of the type described in FIG. 4.

FIG. 2 shows in connection with FIGS. 3, 4 and 4a a schematic, perspective view of a device for removing an oblong burr G which projects from a molded part F which is configured as an airbag cover. The device comprises an energy source E of oblong configuration in a direction of extension R, of the type described in FIG. 1, which is of curved configuration so that it encloses an angle of 360°.

The molded part F is of cap-shaped configuration and accordingly comprises a cover plate of planar configuration with an upper face 6a on which an embossed surface 6 is configured and a lower face 6b remote from the upper face 6a from which an enclosed side wall 6c projects.

In an operable state of the device (which is intended to be adopted hereinafter), the energy source E extends substantially in a horizontally oriented running plane, the energy source E is secured with fastening elements 8, which encompass the sleeve 1 of the energy source E on regions spaced apart from one another in a peripheral direction oriented perpendicular to the direction of extension R, to a retaining element 9 which has a wall 10 enclosed by the energy source E and extending along the energy source E, which is perpendicular to the running plane of the energy source E and is of enclosed configuration.

The wall 10 has an outer face facing the energy source E as well as an inner face remote from the outer face which project over connecting elements 11 arranged spaced apart from one another which project from a lower edge region of the inner face of the wall 10 and which are connected to a base 12 of the retaining element 9 of planar configuration. The base 12 of the retaining element 9 extends in this case perpendicular to the wall 10 and parallel to the extension plane of the energy source E as well as below the energy source E.

Free legs 12a of elongate shape project from the base 12, which extend in an extension plane of the base 12 and respectively have a slot L extending in one respective direction of extension of the free leg 12a. A stand element S of elongate shape passes through each slot L and is fastened to the respective free leg 12a. The stand elements S extend perpendicular to the extension plane of the base 12. The stand elements S comprise two free end portions 12b, 12c and a stand surface 12d on the free end portions 12b arranged in a direction perpendicular to the extension plane of the base 12, below the leg 12a and the base 12. The retaining element 9 rests on the stand surfaces 12d in the operable state, whilst the fastening elements 8 which retain the energy source E are secured to the free end portions 12c of the stand elements S respectively opposing the free end portions 12b.

The wall 10 of the retaining element 9 is formed so that it forms a receiver for the molded part F, which may be inserted into the retaining element 9 with its side wall 6c in an insertion direction perpendicular to the base 12, facing the base 12, so that the side wall 6c of the molded part F comes to rest parallel to the wall 10 of the retaining element 9. When the molded part F is inserted into the retaining element 9 as shown in FIG. 3, the molded part F is supported with the lower face 6b remote from the upper face 6a of the molded part F on an upper edge region of the wall 10 of the retaining element 9 facing the lower face 6b. The position that the molded part F adopts in this state inserted into the retaining element 9 relative to the retaining element 9 is denoted as the machining position.

On four regions of the base 12 spaced apart from one another, which are respectively arranged adjacent to the wall 10, respectively one cylindrical support element 13 projects from the base 12 at right angles, each support element 13 respectively being configured tapered in the manner of a cone at one free end. The four support elements 13 span a trapezoidal region and serve, as is visible in FIGS. 2 and 3, with their free ends as additional supports for the molded part F. When the molded part F is inserted into the retaining element 9 (according to FIG. 3), the molded part F bears with the lower face 6b of its cover plate against the free ends of the support elements 13. In the machining position, the side wall 6c of the molded part F extends between the support elements 13 and the wall 10 of the retaining element 9.

The upper face 6a of the molded part F arranged in the machining position is remote from the base 12 of the retaining element 9 and extends substantially in an extension plane, that is oriented parallel to the running plane of the energy source E. An oblong burr G is formed on the molded part F and extends in a peripheral direction of the molded part F. Oblong burr G forms an edge of the embossed surface 6 of the molded part F which faces the energy source E and forms a division between the upper face 6a and the lower face 6b of the molded part F facing the base 12 of the retaining element 9. The energy source E comprises, as described in FIG. 1, an outer coating 3 which is partially removed on one face of the energy source E facing the burr G so that a gap 5 extending along the energy source E is formed which opposes the oblong burr G and is arranged along the burr G to follow a curved path of the burr G, the energy source E with the outlet region (gap 5) configured thereon enclosing an angle of 360°. The energy source E may, therefore, have an enclosed path (as the gap 5 configured thereon may have) or, as shown in particular in FIG. 4 and FIG. 4a, two free end portions 14a, 14b crossing one another and spaced apart from one another.

In other words, the energy source E extends from such a free end portion 14a following a curved path of the burr G and enclosing an angle of 360°, as far as a further free end portion 14b which crosses substantially at right angles the first free end portion 14a. As a result, as with an enclosed path of the energy source E (and of the outlet region 5) the energy source may also be arranged with its outlet region 5 relative to the oblong burr G, so that the outlet region 5 has, perpendicular to its direction of extension R, a uniform distance from the burr G. A quantitative variation of this spacing may, in this case, only be produced in the region of a cross-over of the two free end portions 14a, 14b, as at this point the outlet region 5 is not able to extend in an enclosed manner (as the two free end portions 14a, 14b are spaced apart from one another).

To remove the oblong burr formed on the molded part F, the molded part F is positioned in the direction of insertion on the retaining element 9 so that the lower face 6b of the molded part F facing the base 12 of the retaining element 9 bears against the upper edge region of the wall 10 of the retaining element 9 and is supported by the support elements 13 on four regions spaced apart from one another. The guiding of the molded part F into this machining position which may be fixed by the retaining element 9 may be carried out manually or by an automated guide device.

If the molded part F is in its machining position, in which the oblong burr G of the molded part F extends along the outlet region of the energy source E formed by the gap 5, the infrared transmitter 2 of the energy source E is activated. According to one exemplary embodiment, the energy source E is excited by applying a voltage for emitting infrared radiation 7, which is concentrated on the burr G through the gap 5, so that the burr G is heated and melted with a removal region which contains the burr G, extending longitudinally in the direction of extension R. As a result the oblong burr G is removed. It is conceivable, where the paths of an oblong burr G are complicated, to remove the burr G in a plurality of removal processes. A plurality of the disclosed devices may be used, in each of these devices a specific portion of the path of the oblong burr being removed. In other words, one of each of these devices has an outlet region of an energy source, which is configured so that it may be arranged along this portion, following a curved path of a portion of the oblong burr to be removed. In this connection, an automated guide device may guide the molded part F into a first device for the removal of a first portion of the oblong burr G and, after removal of said first portion, move said molded part into a further second device in which a further, second portion of the burr G different from the first portion, is removed. In this manner, an oblong burr G which has a complicated path, may be removed in a multi-step, fully-automated process by successive melting of individual, extended portions of the burr G (which are different from one another).

The priority application, German Patent Application No. 10 2005 034 627.8, filed Jul. 19, 2005 including the specification, drawings, claims and abstract, is incorporated herein by reference in its entirety.

What is claimed is:

1. A device for removing an oblong burr from a molded part including an energy source that introduces energy into the burr for removing the burr by heating, the energy source comprising:
an infrared transmitter that irradiates the oblong burr with infrared radiation,
a sleeve for receiving the infrared transmitter with an inner face facing the infrared transmitter and an outer face remote from the infrared transmitter, wherein the sleeve has an outer coating with a surface facing the outside, and an inner face facing the infrared transmitter which at least partially encloses the sleeve, and an outlet region through which energy may be transported in the direction of the burr, wherein the outlet region is formed by a gap in the outer coating that is of oblong configuration such that it may be arranged along the oblong burr following a path of the burr;

wherein infrared radiation emitted by the energy source is concentrated by a radiation-forming element, such that only the burr is irradiated by the infrared radiation, and the radiation-forming element is formed by the gap in the outer coating.

2. The device as claimed in claim 1, wherein the outlet region is curved, so that it may be arranged along an oblong burr, following a curved path of the burr.

3. The device as claimed in claim 1, wherein the outlet region encloses an angle of at least 180°.

4. The device as claimed in claim 1, wherein the outlet region extends along an enclosed curved path.

5. The device as claimed in claim 1, wherein the outlet region encloses an angle of 360°.

6. The device as claimed in claim 1, wherein the outlet region is of oblong configuration in a direction of extension, so that it may be arranged perpendicular to the direction of extension with a uniform spacing from an oblong burr.

7. The device as claimed in claim 1, wherein the energy source is configured such that a transmission of the energy to the molded part by the energy source may be concentrated on the burr.

8. The device as claimed in claim 1, wherein the infrared transmitter is configured as an elongate wire.

9. The device as claimed in claim 8, wherein the infrared transmitter extends longitudinally along the outlet region.

10. The device as claimed in claim 1, wherein the sleeve consists of a glass.

11. The device as claimed in claim 1, wherein the infrared radiation emitted by the energy source may be restricted by the radiation-forming element to a removal region of the molded part containing the burr.

12. The device as claimed in claim 1, wherein the inner face of the outer coating is configured as a reflector for reflecting infrared radiation emitted by the infrared transmitter.

13. The device as claimed in claim 1, wherein the outer coating is gold and/or a gold alloy.

14. The device as claimed in claim 1, wherein the device includes a retaining element that positions the molded part with its burr in a predefinable position relative to the outlet region of the energy source.

15. An arrangement for removing an oblong burr from a molded part comprising a device as claimed in claim 1, the molded part being positioned relative to the outlet region such that the outlet region extends along the burr, following a path of the burr.

16. The arrangement as claimed in claim 15, wherein the burr is of oblong configuration in a direction of extension and is enclosed in the direction of extension.

17. The arrangement as claimed in claim 15, wherein the burr extends in a peripheral direction of the molded part along a surface of the molded part.

18. The arrangement as claimed in one of claim 15, wherein the molded part is configured as an airbag cover.

* * * * *